Sept. 3, 1929. J. S. THOMPSON 1,727,043
FRICTION BRAKE
Filed April 19, 1926
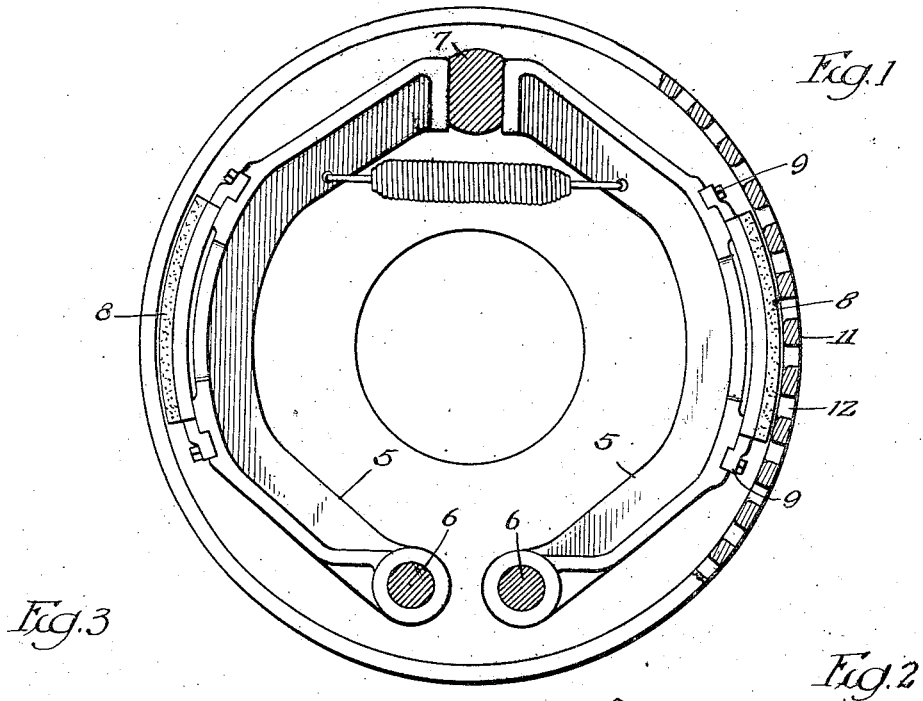
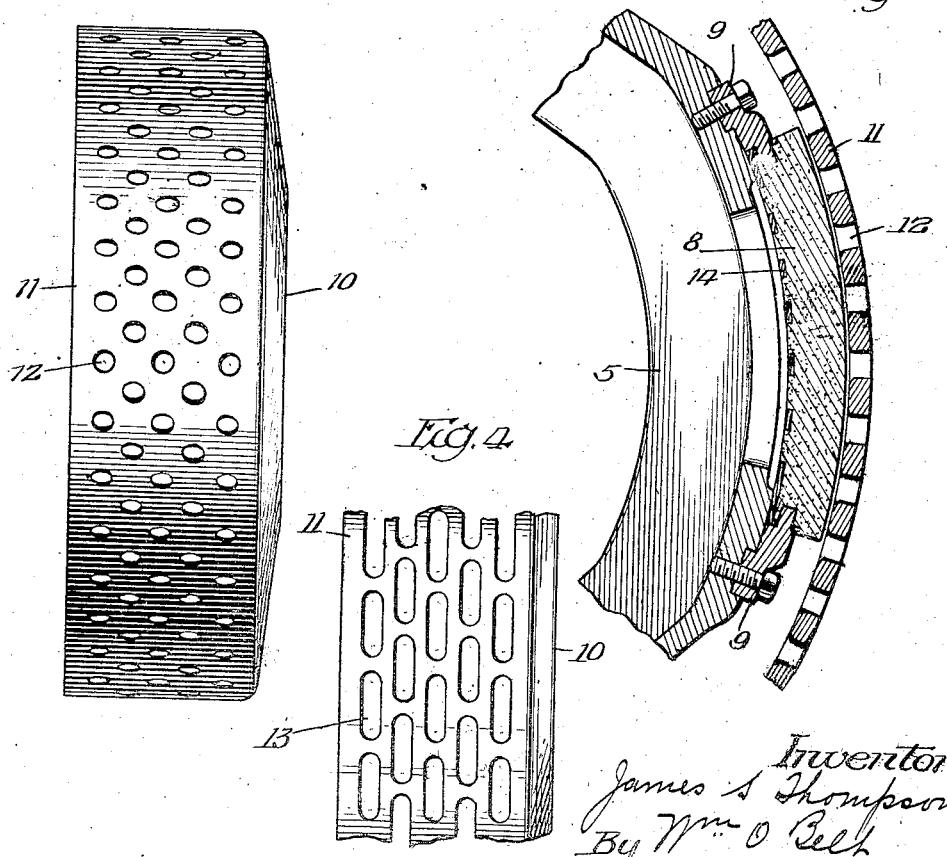

Patented Sept. 3, 1929.

1,727,043

UNITED STATES PATENT OFFICE.

JAMES S. THOMPSON, OF NEW YORK, N. Y., ASSIGNOR TO AMERICAN BRAKE MATERIALS CORPORATION, OF NEW YORK, N. Y., A CORPORATION OF NEW YORK.

FRICTION BRAKE.

Application filed April 19, 1926. Serial No. 102,828.

This invention relates to friction brakes and while it is particularly adapted for expanding brakes to make frictional contact with a drum, which is a form of brake commonly employed in automotive vehicles, it is also useful in many other installations as will be apparent to those skilled in the art.

The invention has for its object generally to provide an efficient brake for automotive vehicles and other installations which will provide desired braking friction and prevent the accumulation of destructive heat in service in the brake drum or in other parts of the brake assembly or in parts associated therewith.

A further object of the invention is to reduce the friction contact area of the braking member with the member to be braked in a brake assembly and to ventilate the parts so that the heat of friction will be quickly dissipated and will not accumulate or become stored in the brake assembly or travel by conduction or radiation or otherwise to parts associated with the brake assembly.

In the accompanying drawings I have illustrated a selected embodiment of the invention in which Fig. 1 is an elevation, partly in section, showing a brake assembly in part.

Fig. 2 is an enlarged sectional view showing part of the head and part of the drum with the shoe carried by the head.

Fig. 3 is a side elevation of a perforated drum.

Fig. 4 is a detailed view of a slotted drum.

I have embodied the invention in different types of brake assemblies but for the purpose of this application I have selected one type among those which have been found to be satisfactory and wherein two brake heads are arranged within a perforated drum and carry composition shoes to frictionally contact with the rim of the drum. The heads 5, 5 are pivoted at one end on studs 6, 6 and are operated by a cam 7 which engages their free ends. These heads may be made in various shapes and designs but I prefer to make them skeleton in form as more particularly set forth in my application, Serial No. 92,048, filed March 3, 1926. Friction shoe 8 is detachably secured on each head by clamps 9 and the seat on the head for this shoe is preferably skeleton in form to permit a circulation of air around and beneath the shoe, but for some purposes it will be entirely satisfactory to provide a substantially solid seat on the head for the shoe, as shown in my co-pending applications Serial No. 100,298 and Serial No. 100,299, filed April 7, 1926.

The drum 10 has its rim 11 provided with a number of perforations which may be in the form of substantially round openings 12 or in the form of slots 13. The number and size of the perforations will depend upon various conditions but generally speaking I desire to provide the rim with as many and as large openings as many conveniently be employed without reducing the strength of the drum to a point where it will become distorted by application of the brake in service and thus reduce its efficiency and life.

I may use a shoe of any kind suitable for the purpose but I prefer to use a composition shoe with or without a metal back 14, as may be found desirable to satisfy different conditions. The shoe is preferably made reversible end for end on its seat and I prefer to make it of a composition which is wear resistant and heat resistant.

The invention is simple in form and is adapted to be embodied in different types and for use in different installations. The primary object of the invention is to get rid of the friction heat as quickly as possible after it is produced so that it will not injuriously affect any of the parts of the brake or travel to other parts where it may cause inconvenience and damage. I have restricted the contact area of the shoe materially as compared with the contact area of the braking members now generally employed for similar service and I have reduced the size of the head to a comparatively skeleton form and I have perforated the rim of the drum with which the shoe contacts so that with all of these changes I obtain an efficient circulation of air around and above the shoe, the head and the drum and thereby provide for ventilating the brake assembly to prevent the accumulation of heat therein and to prevent the travel of heat from the brake assembly to the rim of the wheel or other parts with which the brake is associated. It is said that rubber tires on heavy automotive vehicles are being damaged by heat conducted or radiated from the brakes, and this is due, I believe, to the fact that in the ordinary brakes the friction heat is distributed when produced over a large area of the braking member and the member to be braked, also to the fact that little if any opportunity has been afforded for the dissipation of the heat of friction, and to the further fact that this heat of friction accumulates in the brake assembly and travels therefrom by conduction and by radiation to the rim of the wheel where it sometimes damages the rubber tires and particularly the beads thereof, to a point where replacement is necessary. My invention avoids these disadvantages because, in the first place, it restricts the contact between the braking member and the member to be braked, to a small area where friction heat is produced and thus leaves a large proportion of the rim of the drum free from contact at any one time with the shoe and the contact surface of the member to be braked; the rim of the drum, is perforated so that the heat of friction will be dissipated quickly and will not accumulate in the drum or other parts of the brake assembly. The combination between the shoe of restricted area and the perforated drum is novel and highly satisfactory, and together with the skeleton head provides a brake assembly which is comparatively light in weight, which is efficient in service, and which is adaptable for many different installations.

The perforated drum and the skeleton head and the shoe of restricted area separately and collectively not only provide for ventilating the brake assembly and the parts thereof, but they also provide for and co-operate in maintaining the brake assembly clean and free from accumulation of the products of the road. The perforated drum is important in this respect because any dirt collecting on the drum surface will be cleaned therefrom by contact with the shoe and will fall through the openings in the drum or be discharged at one side of the drum. The shoe contact surface will always be maintained in a clean condition because any dirt which might accumulate between the contact surfaces will be discharged through the perforations in the drum.

I am aware that changes may be made in the form, construction and arrangement of parts of my invention, for example, other forms of fastening means may be employed for securing the shoe on the head; the perforated drum as shown in my application, Serial No. 100,300, filed April 7, 1926 may be used and I reserve the right to make all changes which fall within the scope of the following claim.

I claim:

In a friction brake the combination of a brake drum having a rim provided with a plurality of perforations extending therethrough, a friction shoe comprising a solid imperforate composition body, and means for moving said shoe relative to the drum to carry the body of the shoe into and out of frictional contact with the rim, the contact area of the body being less than one-quarter of the contact area of the rim.

JAMES S. THOMPSON.